United States Patent [19]
Woodworth

[11] Patent Number: 5,093,614
[45] Date of Patent: Mar. 3, 1992

[54] THREE PHASE DELTA REFERENCE TRANSFORMER

[75] Inventor: George K. Woodworth, Gainesville, Va.

[73] Assignee: International Business Machines Corporation, Armonk, N.Y.

[21] Appl. No.: 604,262

[22] Filed: Oct. 29, 1990

[51] Int. Cl.5 .................. H02M 7/04; H02M 7/521; H02M 7/68

[52] U.S. Cl. ........................ 323/361; 336/5; 363/126

[58] Field of Search ................. 323/361; 363/87, 64, 363/84, 136, 126; 336/5, 170, 215, 220, 10, 12

[56] References Cited

U.S. PATENT DOCUMENTS

| | | | |
|---|---|---|---|
| 1,712,491 | 10/1929 | Darrieus | 363/126 |
| 1,932,272 | 10/1933 | Kaar | 363/114 |
| 2,367,625 | 1/1945 | Short | 307/151 |
| 3,127,555 | 3/1964 | Honore et al. | 323/355 |
| 3,353,084 | 11/1967 | Kurimura | 363/77 |
| 3,405,348 | 10/1968 | Beiga et al. | 323/255 |
| 3,424,970 | 1/1969 | Ross | 363/3 |
| 4,156,174 | 5/1979 | Specht | 323/342 |
| 4,779,181 | 10/1988 | Traver et al. | 363/154 |
| 4,818,836 | 4/1989 | Bebber et al. | 219/121.36 |
| 5,006,783 | 4/1991 | Corel et al. | 323/263 |

FOREIGN PATENT DOCUMENTS 0194315  8/1988  Japan ................... 336/170

Primary Examiner—Steven L. Stephan
Assistant Examiner—Ben Davidson
Attorney, Agent, or Firm—Mark A. Wurm

[57] ABSTRACT

A vectorial neutral is provided in a delta power source. The neutral voltage point is provided by auto-transformers which correct and maintain a near constant voltage in the presence of load or bias currents. With a centered referenced voltage established, full wave rectification of a delta power source is possible.

3 Claims, 2 Drawing Sheets

THREE PHASE DELTA REFERENCE TRANSFORMER

BACKGROUND OF THE INVENTION

1. Technical Field

The invention generally relates to three phase delta power distribution systems and more particularly, relates to ground referencing of a delta power system.

2. Background Art

The three phase delta power distribution system is well understood in the field of power engineering and its lack of a ground reference has been both beneficial and a hindrance to operation. There are advantages to having an electrically unreferenced or floating power distribution system. For a fault current or short to occur, two different phase conductors need to be connected to ground simultaneously. The design is tolerant to single faults which reduces the risk of system outages in critical applications. If one leg of the power source is accidentally faulted to ground, the power system can continue to operate without outage or equipment damage.

Delta power system repairs for this type of problem can be deferred until a time period can be set aside for such maintenance. Because there is no major impact to the operation of equipment due to an insulation failure of the conductor wires at a single point, faults can exist without being detected. This poses a risk as a second fault will immediately bring the whole delta power supply system down without warning. This running or hidden failure condition can remove the element of security provided by a delta power system.

Three phase delta power sources have no neutral reference point to allow monitoring individual phase polarity or phase zero voltage crossing points. A synthetic reference point can be created by averaging the three phase line voltages in time to simulate a center voltage point. The synthetic reference point provides a value that approximates the center point of the delta voltage source unless there is an imbalance in the load current.

Errors in the value of the synthetic reference point occur as a result of distortion in phase voltage amplitude due to imbalanced source or load conditions. In circuits detecting the passage of a phase voltage through a ground reference level, any electrical dislocation to the ground point becomes a very significant source for errors. As a detector circuit increases in sensitivity, the greater is the need for a stable and accurate reference ground point.

What is needed is a way to provide a hard centered voltage point within a delta power distribution system. Application of a voltage centering system within a delta power supply allows electrical equipment to be connected by a specific impedance to a reference plane such as earth potential or ground. Electrically anchoring a delta power system to a grounding point allows greater system integrity and safety. With a centered reference voltage, full wave line rectification is possible for a delta power source.

OBJECTS OF THE INVENTION

It is an object of the invention to provide an electrical centering voltage for a delta power system to allow greater system integrity and safety.

It is a further object of the invention to provide a higher tolerance to disruptive energy impressed on the power lines of a delta power supply by non-linear loads.

It is still a further object of the invention to correct the centering of a delta power system from unwanted bias to provide re-centering of the delta system's reference voltage.

SUMMARY OF THE INVENTION

The present invention is a three phase delta reference transformer which establishes and maintains a ground referenced center point voltage on a delta power system. Phases of the three phase delta reference system are tapped by auto-transformers at a one-third point between the bisection of a voltage between the phases and the phase opposite the bisected phase voltages. This provides a vectorial centering of the delta power supply.

With a center point established and maintained by the delta reference transformer, full rectification may be had within a delta power system.

The invention provides a vectorial neutral in the unreferenced delta power distribution system. The containment/guiding of noise satisfaction currents returning to the energy source through a conductor helps control noise, magnetic fields, or electrolysis within the delta reference system. An imaginary but controlled zero reference facilitates accurate ground fault instrumentation.

BRIEF DESCRIPTION OF THE DRAWINGS

The features and advantages of the invention will be more fully a with reference to the accompanying figures.

DESCRIPTION OF THE BEST MODE FOR CARRYING OUT THE INVENTION

Figure 1:
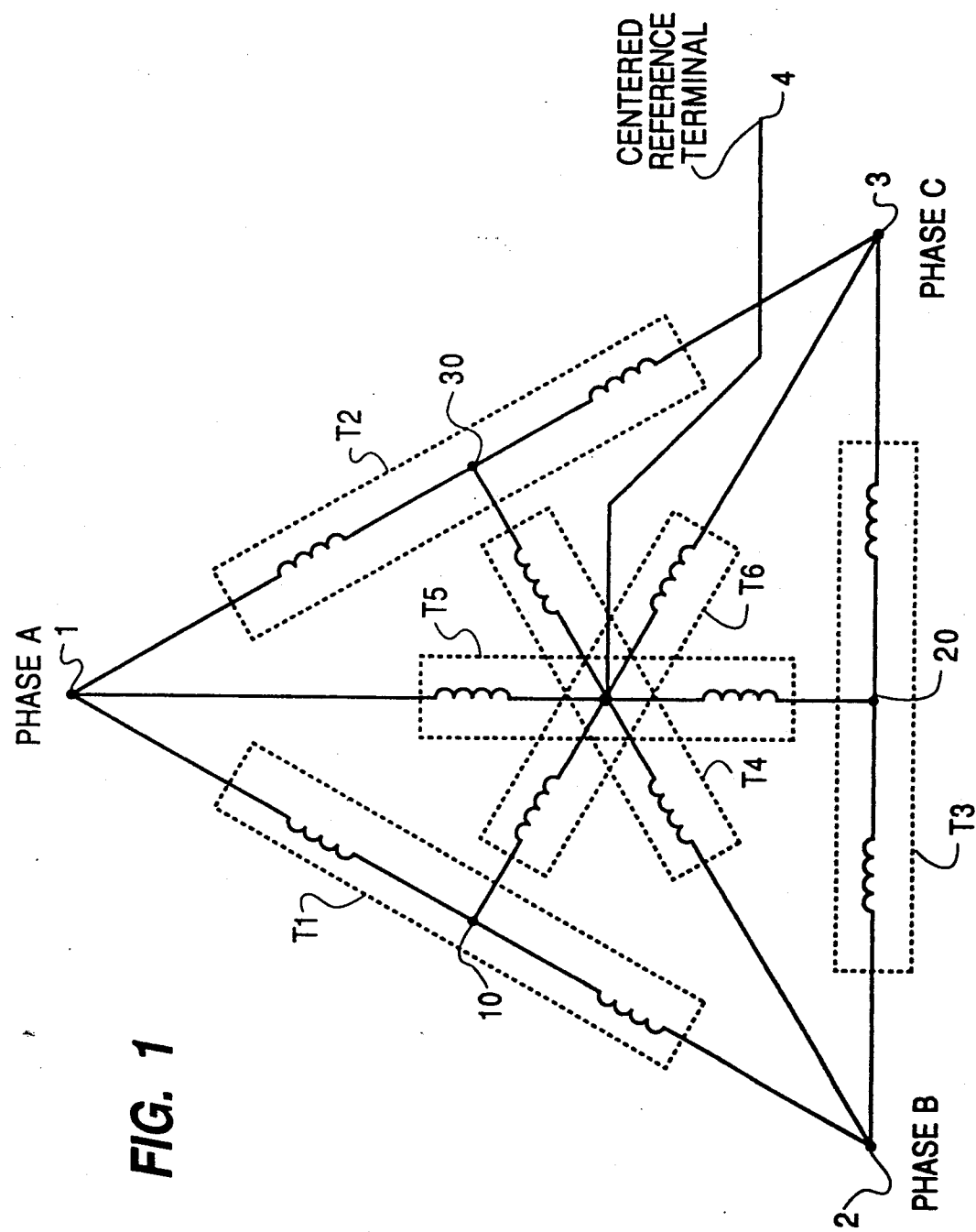
FIG. 1 shows a sketch of the delta referencing transformer design of the present invention.

A delta power distribution system is represented in FIG. 1 as a triangle connecting point 1 to point 2 to point 3 and back to point 1. Phase A is associated with point 1, phase B is associated with point 2 and phase 3 is associated with point 3 of the delta power supply. The delta referencing transformer design of the present invention shows a series of six transformers connected between the phases of the delta reference transformer in such a manner as to obtain a vectorial midpoint representing a centering or reference point for the delta power system. Transformer T1 is interposed between phase A and phase B and is tapped at a midpoint 10 which has a voltage value of one-half the phase A to phase B voltage value.

Likewise, a midpoint voltage between phase B and phase C is provided by auto-transformer T3 at 20 having a voltage value of one-half the phase B to phase C voltage value. Auto-transformer T2 provides the midpoint value 30 between phase A and phase C. The midpoint value 10 between phase A and phase B is connected to phase C through the auto-transformer T6 which has a at tap one-third/two-thirds of the value of the voltage between point 10 and phase C. Intersecting the tap on T6 at a one-third, two-thirds voltage between auto-transformer T2 and phase B is auto-transformer T4. The intersection of the auto-transformers T4 and T6 is at ground terminal 4. Likewise, auto-transformer T5 is connected one-third/two-thirds between the midpoint 20 and phase A voltage.

Common reference point 4 is the vectorial generation of a delta power supply center point. The delta center point voltage of the three auto-transformers T4, T5 and T6 are all equal and are represented by the midpoint voltage between two phases connected at one-third the voltage between the midpoint voltage and the voltage of the phase opposite the midpoint. The design of the reference transformer lends itself to correction of power system disturbance by providing vectorially correct centering currents to re-center the delta power supply reference voltage with respect to ground potential. These synchronous voltage vectors are of the proper amplitude to add to each phase that voltage value necessary to return it to ground or the zero volt reference point. All of the three zero voltage points are then connected together and utilized as a power system zero volt center point. Noise and other dislocation currents can flow back through this point reference to the power source.

The reference transformer design is set up to provide the correction voltages in a specific ratio to the input voltage power line. This allows the design to track and compensate for voltage deviations in the power source due to operator adjustments or sag resulting from load changes. The design of this device is not limited in power and can utilize several separate transformers or a single core to provide this function.

The noise satisfaction path provided to ground, by-passes load equipment not otherwise associated with the noise current imbalance. This minimizes unwanted currents from circulating through another power line. By isolating noise currents from the general distribution and providing an alternate return path, the noise energy is diminished within the power source and associated distribution wiring.

As shown in FIG. 1, the centering is performed within the correction delta reference transformer. The first set of three windings T1, T2 and T3 is composed of a set of independent center tapped auto-transformers. Each of the three windings are respectively attached across a different pair of power lines. This connection creates an electrical midpoint between every pair of phases and is used to establish the vectorial voltages associated with the three phase power source.

This allows a true phase voltage to be created from the line to line voltages provided by the delta system. In this device, an additional set of auto-transformer windings are connected across the true vector voltage terminals. These windings are tapped to provide a voltage point that is equivalent to the proper amplitude necessary to coincide with the ground point. This vector voltage auto-transformer winding is tapped at a point one-third of one end of the winding. This allows the vector voltage to be divided into a one-third and two-third segment as shown in FIG. 1. The one-third midpoint corresponds to the delta power line zero voltage point. All of the three zero point terminals are connected together to form a common terminal identified as the delta ground reference point.

Any imbalance of the delta reference with respect to the ground point will dislocate this node, causing opposing correction currents to resist this change. The correction currents available at this reference point result in line currents that push the delta reference back toward equilibrium with respect to ground. The auto-transformers are required to only supply steering currents as needed to reestablish centering of the system. These currents will be small when compared to the total system power level. Correction currents only flow when there is an imbalance in the system and no power is transformed if the system is balanced about the electrical center point of the delta power source.

The present invention can supply current to assist in maintaining a ground referenced center point on an existing delta power source. Noise and unbalanced loading conditions can be minimized by adding a balanced correction transformer to the power lines. The installation location is not critical on the power system and the auto-transformer is unaffected by out of balance phase to phase line voltages within the system.

The physical size of the device is small as it only needs to provide that level of correction current to center the distribution system about the ground potential. In normally balanced applications, this device would not consume power until an imbalance occurred.

The design is not limited by implementation and can be fabricated on a single core as shown in FIG. 1 or on several smaller cores and electrically interconnected in the same manner as FIG. 1.

Figure 2:
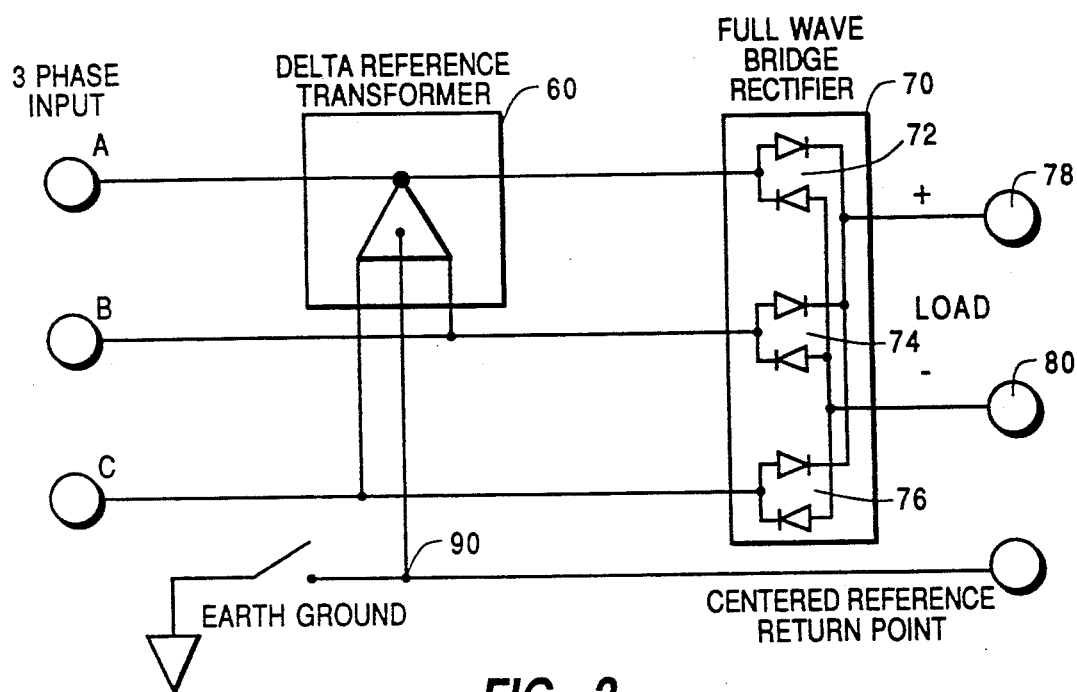
FIG. 2 is a schematic diagram of the delta reference transformer in conjunction with a full wave bridge rectifier to obtain a rectified electrical output.

The delta reference transformer of the present invention in combination with a full wave bridge rectifier provides a means for obtaining full wave line rectification on a three phase delta power source. Heretofore, such full wave rectification in a delta power source was not easily obtainable. The setup as shown in FIG. 2 employs a delta reference transformer having phase A, phase B and phase C and the reference voltage point 70 connected to earth ground. The outputs from the phases A, B, C of the delta power source are connected to a full wave bridge rectifier 70 containing back-to-back diode pairs 72, 74 and 76. This interconnection provides for a plus and minus voltage at the terminals 78 and 80 which can be referenced from the earth ground reference 90 to provide positive and negative DC voltage outputs.

Figure 3:
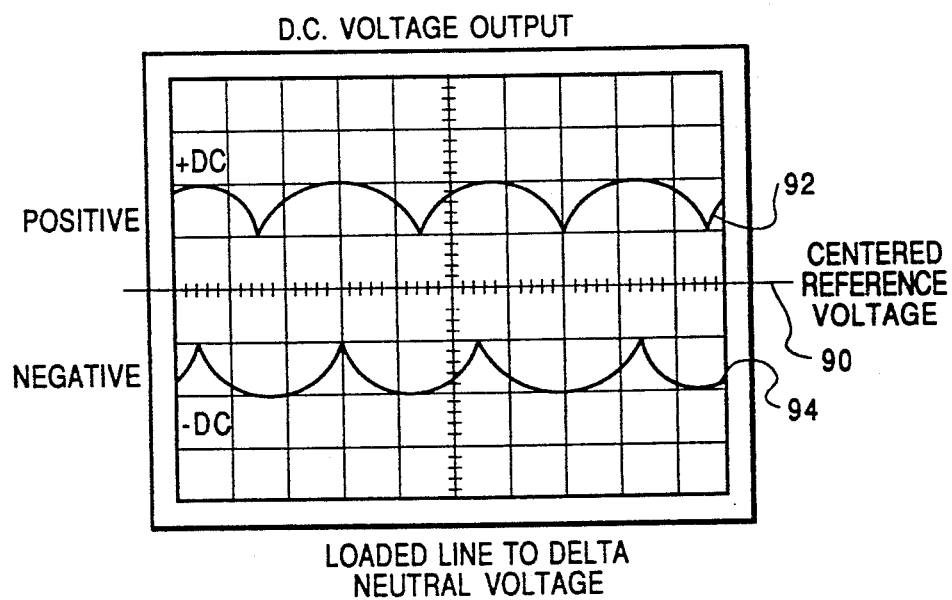
FIG. 3 is a graph showing the output on the full wave bridge rectifier of FIG. 2.

Shown in FIG. 3 is the voltage output waveform employing the full wave bridge rectifier in combination with the delta reference transformer of the present invention. The positive form 92 and the negative waveform 94 are referenced about the ground reference or neutral voltage 90. When using a 480 volt delta three phase source, full wave rectification provides a plus 300 volt and a minus 300 volt for a total of 600 volt differential, full wave rectified voltage.

A full wave line rectification as shown allows a delta power source to behave as if it were configured as a wye power source. It provides a reference point that does not rely on balance loading to maintain the operating center point and allows power equipment to draw unbalanced DC currents.

Correction currents needed to restore the common or neutral reference are developed in the windings of the reference transformer. Full rectification of delta power line generates DC voltages centered about the reference transformer neutral terminal. Either positive or negative currents may be drawn from the power source without affecting the position of this neutral terminal with respect to earth ground. Various combinations of capacitive and resistive elements can be connected across the full wave bridge rectifier without affecting its stability. When connected to earth ground, the delta phase voltages maintain their normal balanced relationship with respect to the ground potential.

The delta centering transformer provides noise rejection by forcing displaced phase currents to circulate only within the load equipment generating that imbalance. This prevents circulation currents from inducing noise currents into other load equipment on the same power source. Rectification of the power line creates noise satisfaction currents that seek a path back to the source. When these currents are provided a terminal to return through, they take the shortest loop and will not propagate through other load equipment. Single phase line to line currents do not draw the delta reference transformer off-center and contribute nothing to chassis or hull current. In an ungrounded delta power system, the path or noise currents is typically through power line filter elements of adjacent equipment. For example if phase "A" were drawing current into the cabinet ground, the return current path can be back through phase "B" and "C" impedances in another part of the power system. This may victimize another piece of load equipment by superimposing power line noise current on it to close the path for the rectifier noise current generated.

An addition of the reference transformer to a normal delta system does not require any rewiring and causes no disturbance as it does not pass or otherwise handle load current. Only when the center neutral point of a delta power system is displaced, does the transformer generate a balancing current to drive the delta system back to a neutral reference point. Voltage phase detectors can also use the referencing transformer to immediately detect any fault currents from any combination of phases to ground paths.

Although a specific embodiment has been disclosed, it will be understood by those having skill in the art that changes can be made to that specific embodiment without departing from the spirit and the scope of the invention.

What is claimed is:

1. A delta reference transformer for providing a neutral reference point in a three phase delta power source comprising:
    a first set of transformers electrically tapping a voltage midpoint of each phase of the three phase delta power source;
    a second set of transformers connecting each of the voltage midpoints tapped between phases of the delta power source to the phase opposite the voltage midpoint tap;
    an electrical interconnection of the second set of transformers at a one-third voltage point from the voltage midpoint tap of the three phases of the delta power source;
    wherein the point of electrical interconnection is a centered reference voltage within the delta power source.

2. The delta reference transformer of claim 1, wherein the first and second set of transformers are auto-transformers.

3. The delta reference transformer of claim 2, wherein the transformers are formed on a single core.

* * * * *